(12) United States Patent
Nikhara et al.

(10) Patent No.: US 10,409,141 B2
(45) Date of Patent: Sep. 10, 2019

(54) SYSTEM AND METHOD FOR IMPROVED CAMERA FLASH

(71) Applicant: QUALCOMM Incorporated, San Diego, CA (US)

(72) Inventors: Soman Nikhara, Hyderabad (IN); Ravi Shankar Kadambala, Hyderabad (IN); Bapineedu Chowdary Gummadi, Hyderabad (IN)

(73) Assignee: Qualcomm Incorporated, San Diego, CA (US)

( * ) Notice: Subject to any disclaimer, the term of this patent is extended or adjusted under 35 U.S.C. 154(b) by 84 days.

(21) Appl. No.: 15/710,752

(22) Filed: Sep. 20, 2017

(65) Prior Publication Data
US 2019/0086769 A1 Mar. 21, 2019

(51) Int. Cl.
*G03B 15/05* (2006.01)
*H04N 5/232* (2006.01)
(Continued)

(52) U.S. Cl.
CPC ............. *G03B 15/05* (2013.01); *G03B 7/08* (2013.01); *G03B 7/16* (2013.01); *G03B 13/36* (2013.01); *H04N 5/2256* (2013.01); *H04N 5/2351* (2013.01); *H04N 5/2352* (2013.01); *H04N 5/2353* (2013.01); *H04N 5/2354* (2013.01); *H04N 5/23212* (2013.01); *H04N 5/23241* (2013.01); *H05B 33/0845* (2013.01); *G03B 2215/05* (2013.01)

(58) Field of Classification Search
CPC ............. H04N 5/2256; H04N 5/23212; H04N 5/2351; H04N 5/2354; G03B 7/16; G03B 7/08; G03B 15/05
See application file for complete search history.

(56) References Cited

U.S. PATENT DOCUMENTS

| 5,912,699 A * | 6/1999 | Hayenga .............. G02B 21/26 348/132 |
| 7,525,592 B2 * | 4/2009 | Kato .................. H04N 5/2351 348/229.1 |

(Continued)

FOREIGN PATENT DOCUMENTS

| CN | 103581559 A | 2/2014 |
| EP | 3163346 A1 | 5/2017 |

(Continued)

OTHER PUBLICATIONS

International Search Report and Written Opinion—PCT/US2018/051664—ISA/EPO—dated Dec. 3, 2018.

*Primary Examiner* — Nicholas G Giles

(74) *Attorney, Agent, or Firm* — Kilpatrick Townsend & Stockton, LLP

(57) ABSTRACT

Methods, systems, computer-readable media, and apparatuses for improved camera flash are presented. In some embodiments, a method includes performing an autofocus technique on a scene to obtain an autofocus output. The method also includes obtaining an ambient light measurement of the scene. The method further includes adjusting a sensitivity of an image sensor based at least in part on the autofocus output and the ambient light measurement. The method additionally includes, after adjusting the light sensitivity of the image sensor, illuminating the scene using a pre-flash.

28 Claims, 5 Drawing Sheets

(51) Int. Cl.
    *H04N 5/225*     (2006.01)
    *H04N 5/235*     (2006.01)
    *H05B 33/08*     (2006.01)
    *G03B 7/16*     (2014.01)
    *G03B 7/08*     (2014.01)
    *G03B 13/36*     (2006.01)

(56) References Cited

U.S. PATENT DOCUMENTS

| | | | |
|---|---|---|---|
| 8,150,252 B2 * | 4/2012 | Osawa | G03B 7/097 |
| | | | 396/165 |
| 2005/0157206 A1 * | 7/2005 | Kato | H04N 5/2351 |
| | | | 348/370 |
| 2006/0171697 A1 * | 8/2006 | Nojima | G03B 13/36 |
| | | | 396/103 |
| 2009/0009649 A1 | 1/2009 | Okamoto | |
| 2010/0073528 A1 * | 3/2010 | Lee | H04N 5/243 |
| | | | 348/255 |
| 2011/0298947 A1 * | 12/2011 | Guo | H04N 5/2354 |
| | | | 348/224.1 |
| 2015/0009396 A1 | 1/2015 | Ueno et al. | |

FOREIGN PATENT DOCUMENTS

| | | |
|---|---|---|
| JP | 4586211 B2 | 11/2010 |
| JP | 5887759 B2 | 3/2016 |
| JP | 2017032754 A | 2/2017 |

* cited by examiner

SYSTEM AND METHOD FOR IMPROVED CAMERA FLASH

BACKGROUND

Many mobile devices (e.g., smartphones, tablets, etc.) have become the primary photo-capturing devices for many users. These mobile devices often include a flash device to properly illuminate a capture a scene. However, flash devices often consume a significant amount of power on mobile devices. For example, a typical flash may use 1 amp of current across 2-3 frames. Further, the flash intensity is constant while capturing the image, irrespective of the amount of ambient light available at the time. That is, traditional pre-flash metering techniques use a constant flash intensity to expose the image and only control the duration of the flash adjust the scene illumination.

Additionally, traditional pre-flash techniques are slow. For example, in typical flash metering, a pre-flash generally takes 4 to 10 frames for convergence. The length of the pre-flash can depend on various factors such as the scene distance and the amount of ambient light. The slow pre-flash increases the flash snapshot latency.

The embodiments described herein solve these problems, both individually and collectively.

BRIEF SUMMARY

Certain embodiments are described that improve camera flash techniques.

In some embodiments, a method may include performing an autofocus technique on a scene to obtain an autofocus output. The method may also include receiving light from a scene. The method may also include obtaining an ambient light measurement of the scene based on the received light. The method may further include adjusting a sensitivity of an image sensor based at least in part on the autofocus output and the ambient light measurement. The method may additionally include, after adjusting the light sensitivity of the image sensor, illuminating the scene using a pre-flash.

In some embodiments, the autofocus output may include an autofocus confidence value and a focus position pertaining to the scene.

In some embodiments, the method may also include determining whether the autofocus confidence value is above a threshold confidence value. The method may further include obtaining a focus position value from a look-up table (LUT), based at least in part on the focus position.

In some embodiments, the method may also include determining whether the autofocus confidence value is below a threshold confidence value. The method may further include, in response to determining that the autofocus confidence value is below the threshold confidence value, not performing the adjusting step.

In some embodiments, the autofocus output comprises a focus position pertaining to the scene.

In some embodiments, the image sensor may be housed within a camera device.

In some embodiments, the autofocus technique may include at least one of the following autofocus techniques: laser autofocus, phase detection autofocus, or contrast autofocus.

In some embodiments, the method may also include, after illuminating the scene using the pre-flash, capturing an image of the scene.

In some embodiments, a system may include a lens, a light source, an image sensor coupled to a processor, and an ambient light sensor coupled to the processor. The ambient light sensor may be configured to receive light from a scene. The processor may be configured to perform, via the lens, an autofocus technique on the scene to obtain an autofocus output. The processor may be further configured to obtain, via the ambient light sensor, an ambient light measurement of the scene based on the received light. The processor may be further configured to adjust a sensitivity of the image sensor based at least in part on the autofocus output and the ambient light measurement. The processor may be further configured to, after adjusting the light sensitivity of the image sensor, illuminate the scene using a pre-flash via the light source.

In some embodiments, an apparatus may include means for performing an autofocus technique on a scene to obtain an autofocus output. The apparatus may also include means for receiving light from the scene. The apparatus may also include means for obtaining an ambient light measurement of the scene based on the received light. The apparatus may further include means for adjusting a sensitivity of an image sensor based at least in part on the autofocus output and the ambient light measurement. The apparatus may additionally include means for, after adjusting the light sensitivity of the image sensor, illuminating the scene using a pre-flash.

In some embodiments, one or more non-transitory computer-readable media may store computer-executable instructions that, when executed, cause one or more computing devices to perform an autofocus technique on a scene to obtain an autofocus output, receive light from a scene, obtain an ambient light measurement of the scene based on the received light, adjust a sensitivity of an image sensor based at least in part on the autofocus output and the ambient light measurement, and after adjusting the light sensitivity of the image sensor, illuminate the scene using a pre-flash.

BRIEF DESCRIPTION OF THE DRAWINGS

Aspects of the disclosure are illustrated by way of example. In the accompanying figures, like reference numbers indicate similar elements.

DETAILED DESCRIPTION

Several illustrative embodiments will now be described with respect to the accompanying drawings, which form a part hereof. While particular embodiments, in which one or more aspects of the disclosure may be implemented, are described below, other embodiments may be used and various modifications may be made without departing from the scope of the disclosure or the spirit of the appended claims.

Camera flash devices can be improved and optimized a few different ways. First, a pre-flash metering technique can be used to determine the intensity required by the main flash and the main flash can be illuminated at an intensity level based on the determination. For example, the main flash can be illuminated at a low, medium, or high flash intensity based on the amount of light deemed to be required by the pre-flash metering. Different exposure sensitivity thresholds may be configurable for the different flash intensities (e.g., low, medium, and high flash intensities). For example, if a scene is determined to have sufficient brightness, a low flash intensity may be use to capture the scene. This may be done without reconfiguring the flash (described in further detail below. In another example, if a scene is far and dark, the flash may be reconfigured to have a medium or high flash intensity based on the pre-flash metering.

Second, in a scenario where the pre-flash metering determines that the scene requires only a low level of flash illumination, the light illuminated from the pre-flash may be used to expose the scene. For example, the illumination intensity of the pre-flash may already be at the "low" level of flash intensity, and thus the pre-flash may remain active when it is determined that the scene only requires a "low" level of flash intensity for proper exposure. Accordingly, by leaving the pre-flash on, power savings can be realized since the pre-flash does not need to be turned off prior to activating the main flash, as is usually required. Additionally, by leaving the pre-flash on, latency of capturing an image may also be improved.

Third, the image sensor sensitivity of the camera can be adjusted prior to the pre-flash by using the ambient light sensor and a distance estimate obtained from autofocus (AF) techniques (e.g., laser AF, phase detection AF, contrast AF, etc.). For example, if the AF confidence value is high, the image sensor sensitivity can be adjusted based on (1) a look-up-table (LUT) defining sensitivities for various focus positions (i.e., distance to object) in the scene and (2) data from the ambient light sensor. By "pre-adjusting" the image sensor sensitivity prior to the pre-flash, the time for pre-flash convergence may be reduced and overall flash time for all scenes may also be reduced, resulting in power savings on the device and improving a latency in capturing an image.

Figure 1:
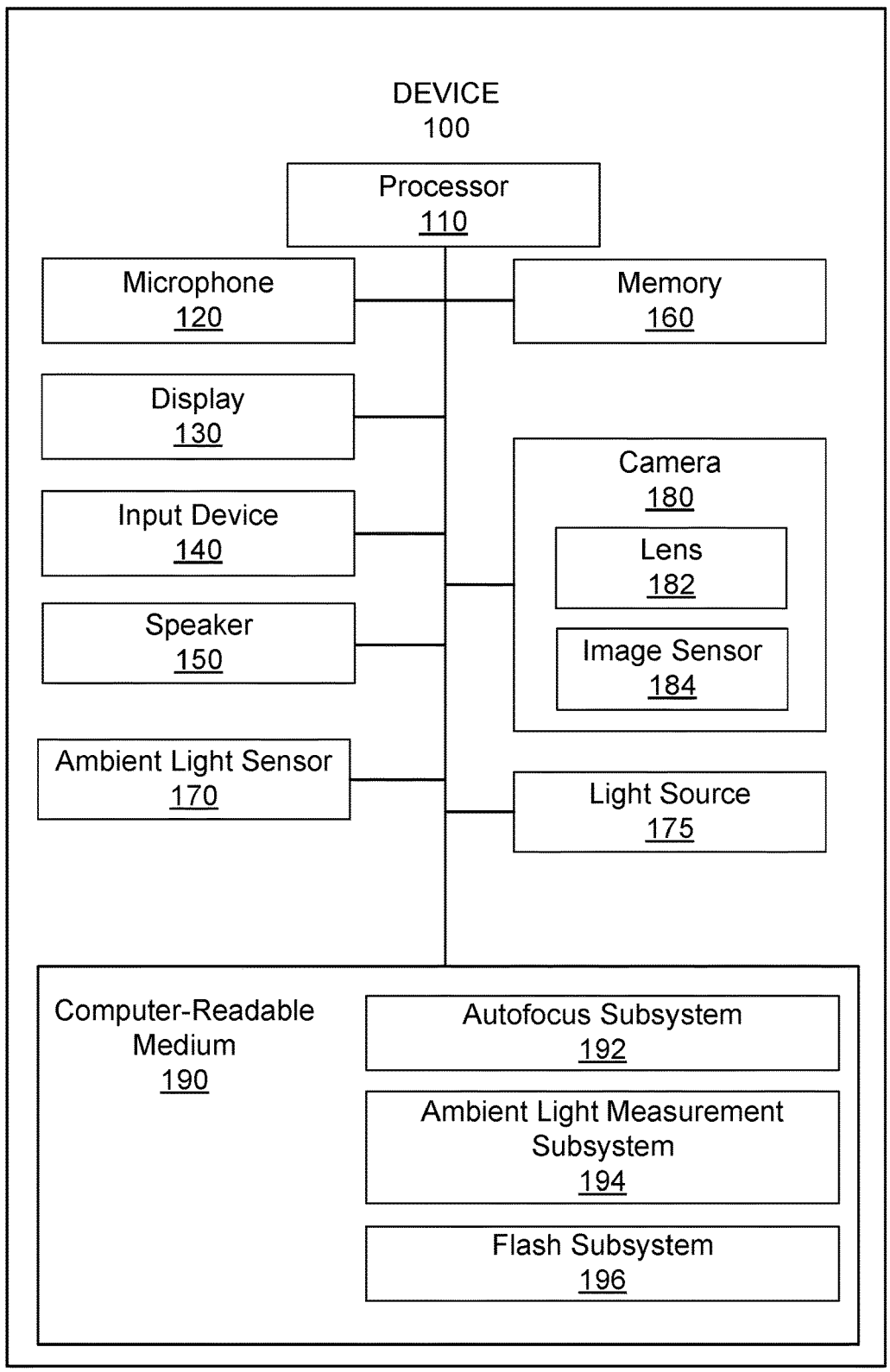
FIG. 1 illustrates a simplified diagram of a device 100 that may incorporate one or more embodiments.

FIG. 1 illustrates a simplified diagram of a device 100 that may incorporate one or more embodiments. Device 100 may include a processor 110, microphone 120, display 130, input device 140, speaker 150, memory 160, ambient light sensor 170, camera 180, and computer-readable medium 190.

Processor 110 may be any general-purpose processor operable to carry out instructions on the device 100. The processor 110 is coupled to other units of the device 100 including microphone 120, display 130, input device 140, speaker 150, memory 160, camera 180, and computer-readable medium 190.

Microphone 120 may be any device that converts a sound input to an electrical signal. The microphone 120 may capture a user's voice or any other sound in a proximity to the device 100.

Display 130 may be any device that displays information to a user. Examples may include an LCD screen, CRT monitor, or seven-segment display. In some embodiments, display 130 may be a touchscreen display capable of receiving input for interaction with a camera application executing on the device 100.

Input device 140 may be any device that accepts input from a user. Examples may include a keyboard, keypad, mouse, or touch input. In some embodiments, display 130 may also function as input device 140.

Speaker 150 may be any device that outputs sound to a user. Examples may include a built-in speaker or any other device that produces sound in response to an electrical audio signal.

Memory 160 may be any magnetic, electronic, or optical memory. An example of memory 160 may be dynamic random access memory (DRAM).

Ambient light sensor 170 may be configured to detect light or brightness in a similar way as the human eye. The ambient light sensor 170 may be a specific version of a photodiode, capable of converting light into a voltage or current. The ambient light sensor 170 may have a typical spectral response ranging from 350 nm to 1100 nm. As such, the ambient light sensor 170 can detect the amount of received ambient light within an environment in which the device 100 is present.

Light source 175 may be any light source usable for flash photography to illuminate a scene. Light source 175 may produce a flash of artificial light (typically $\frac{1}{1000}$ to $\frac{1}{200}$ of a second) at a color temperature of about 5500 Kelvin. In some implementations, the flash of artificial light may remain on for a maximum time period dependent on the specific hardware implementation or may remain on continuously in a low intensity operation. A Correlated Color temperature (CCT) may be fixed for single LED source and its value may depend on the specific hardware, whereas a Dual Tone LED may be able to produce the multiple CCTs which may be controlled by an algorithm. As shown, light source 175 may be contained within the device 100. In some embodiments, light source 175 may be external to the device 100 and be communicatively coupled to device 100 (e.g., light source 175 may be mounted via a standardized "accessory mount" bracket to the device 100). The light source 175 may provide light for either a pre-flash or main flash, or both. Before the actual exposure one or more small flashes, called "pre-flashes", may be emitted. The light returning through the lens may be measured and this value may be used to calculate the amount of light necessary for the actual exposure. Multiple pre-flashes can be used to improve the flash output. Once the amount of light necessary for the actual exposure is determined, the scene may be properly exposed using a main flash to illuminate the scene.

Camera 180 may be configured to capture one or more images via a lens 182 located on the body of device 100. The lens 182 may be a part of the camera 180 subsystem. The captured images may be still images or video images. The camera 180 may include a CMOS image sensor to capture the images. Various applications running on processor 110 may have access to camera 180 to capture images. It can be appreciated that camera 180 can continuously capture images without the images actually being stored within device 100. Captured images may also be referred to as image frames.

Camera 180 may also include image sensor 184. Image sensor 184 may be a sensor that detects and conveys information that constitutes an image. It may do so by converting the variable attenuation of light waves (as they pass through or reflect off objects) into signals, small bursts of current that convey the information. The waves can be light or other electromagnetic radiation. Image sensors are used in electronic imaging devices of both analog and digital types. For example, when open, lens 182 may allow light to shine through to the image sensor 184. Image sensor 184 may capture the light through the lens 182 and convert the light to an electronic signal that represents the image.

Computer-readable medium 190 may be any magnetic, electronic, optical, or other computer-readable storage medium. Computer-readable storage medium 190 may store computer-readable code comprising code subsystems, including autofocus subsystem 192, ambient light measurement subsystem 194, and flash subsystem 196.

Autofocus (AF) subsystem 192 contains code that, when executed by processor 110, may perform an autofocus technique on a scene visible through the camera 180. The autofocus subsystem 192 may rely on one or more sensors to determine the correct focus for a given scene. In some embodiments, the autofocus subsystem 192 may rely on a single sensor, while others use an array of sensors. In some embodiments, the AF subsystem 192 may use through-the-lens optical AF sensors, with a separate sensor array providing light metering. The AF subsystem 192 may use active, passive, or hybrid AF techniques. In some embodiments, the AF subsystem 192, in performing an autofocus technique, may obtain an AF confidence value indicating the confidence of the focus position within the scene.

Ambient light measurement subsystem 194 contains code that, when executed by processor 110, may analyze an ambient light measurement obtained by the ambient light sensor 170. It can be appreciated that ambient light measurement subsystem 194 can include logic to control ambient light sensor 170. For example, ambient light sensor 170 may obtain an ambient light measurement upon instruction to do so from ambient light measurement subsystem 194. Ambient light measurement subsystem 194 may also further analyze the obtained ambient light measurement from ambient light sensor 170. For example, ambient light measurement subsystem 194 may obtained an ambient light measurement and relay results to the flash subsystem 196 (described below). In some embodiments, the ambient light measurement subsystem 194 may instruct the ambient light sensor 170 to obtain an ambient light measurement at predetermined intervals, e.g. every 10 seconds.

Flash subsystem 196 contains code that, when executed by processor 110, may configure parameters associated with image sensor 184 and light source 175 prior to emitting a flash for capturing an image. For example, flash subsystem 196 may adjust the intensity required by the main flash, by adjusting the intensity of light source 175, based on a pre-flash metering technique and the main flash can be illuminated at an intensity level based on measurements obtained from the pre-flash metering technique.

In another example, the flash subsystem 196 may adjust light source 175 to illuminate at a low level intensity if a pre-flash metering technique determines that the scene requires only a low level of main flash illumination to be properly exposed. In other words, the light illuminated from the pre-flash may also function as the main flash and may be used to expose the scene. The pre-flash may remain active when it is determined that the scene only requires a "low" level of flash intensity for proper exposure, instead of being turned off prior to activating the main flash.

In another example, the flash subsystem 196 may adjust a sensitivity of image sensor 184 prior to the pre-flash based on measurements obtained from the ambient light measurement subsystem 194 and a distance estimate to a focal point within the scene obtained from autofocus subsystem 192. An example of a sensitivity setting for the image sensor 184 may include ISO setting and exposure time.

Figure 2:
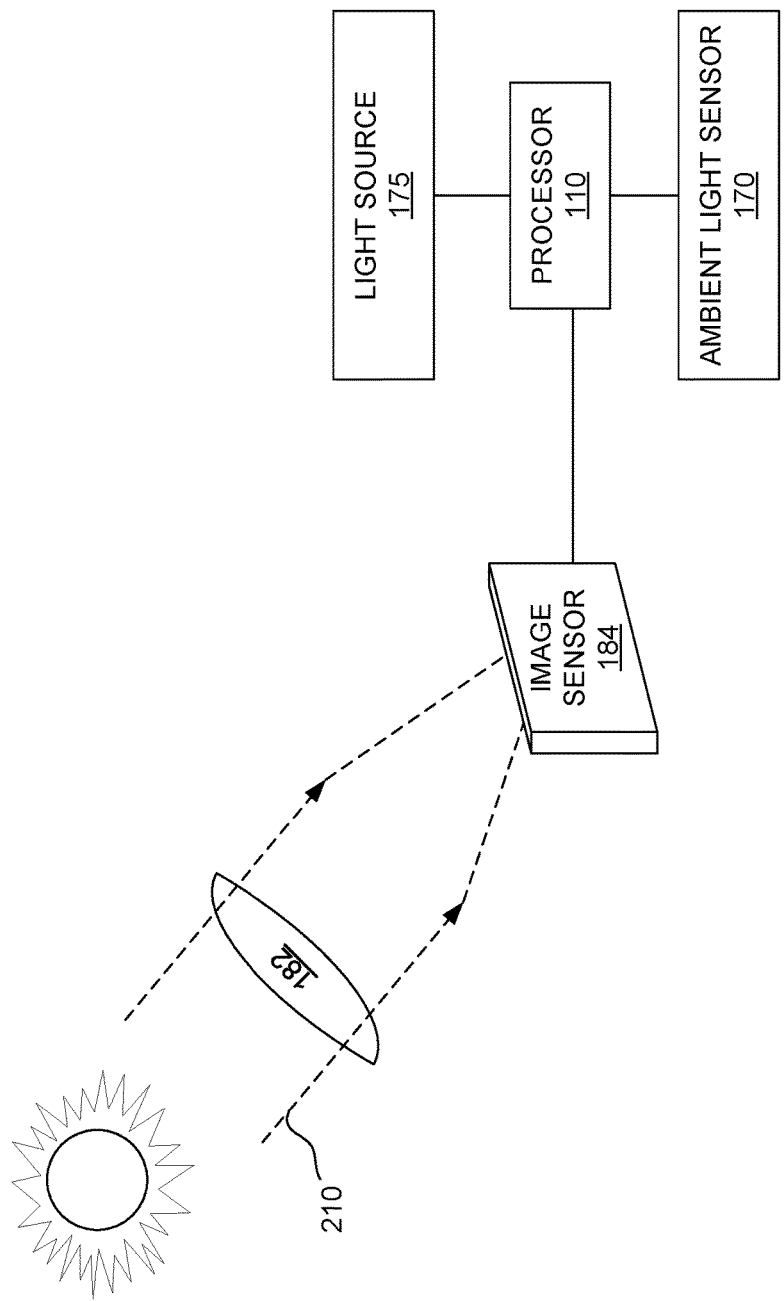
FIG. 2 is a block diagram of a scene and various components of device.

FIG. 2 is a block diagram of a scene 200 and various components of device 100. In the illustrated embodiment, the scene 200 may include incident light 210 that passes through lens 182. The image sensor 184 may be coupled with the lens 182 to receive the focused incident light and in response produce a digital image thereof. A processor 110 may be coupled to the image sensor 184 to control the image sensor 184. The processor 110 may also be coupled to light source 175 and ambient light sensor 170. The processor 110 may comprise any suitable embedded microprocessor or state machine that can manage overall operations of the device 100. For example, the device 100 may be a "thin" device with minimal functionality (such as a personal computer peripheral "Web" camera). Alternatively, the camera may be embedded in a smart phone handset, in which case the processor 110 could be an embedded applications processor in the handset. As described above, the light source 175 may function to illuminate the scene 200 for proper exposure. Ambient light sensor may obtain an ambient light measurement of the scene 200 to be used for adjusting the image sensor 184 prior to triggering a pre-flash or main flash from light source 175.

Figure 3:
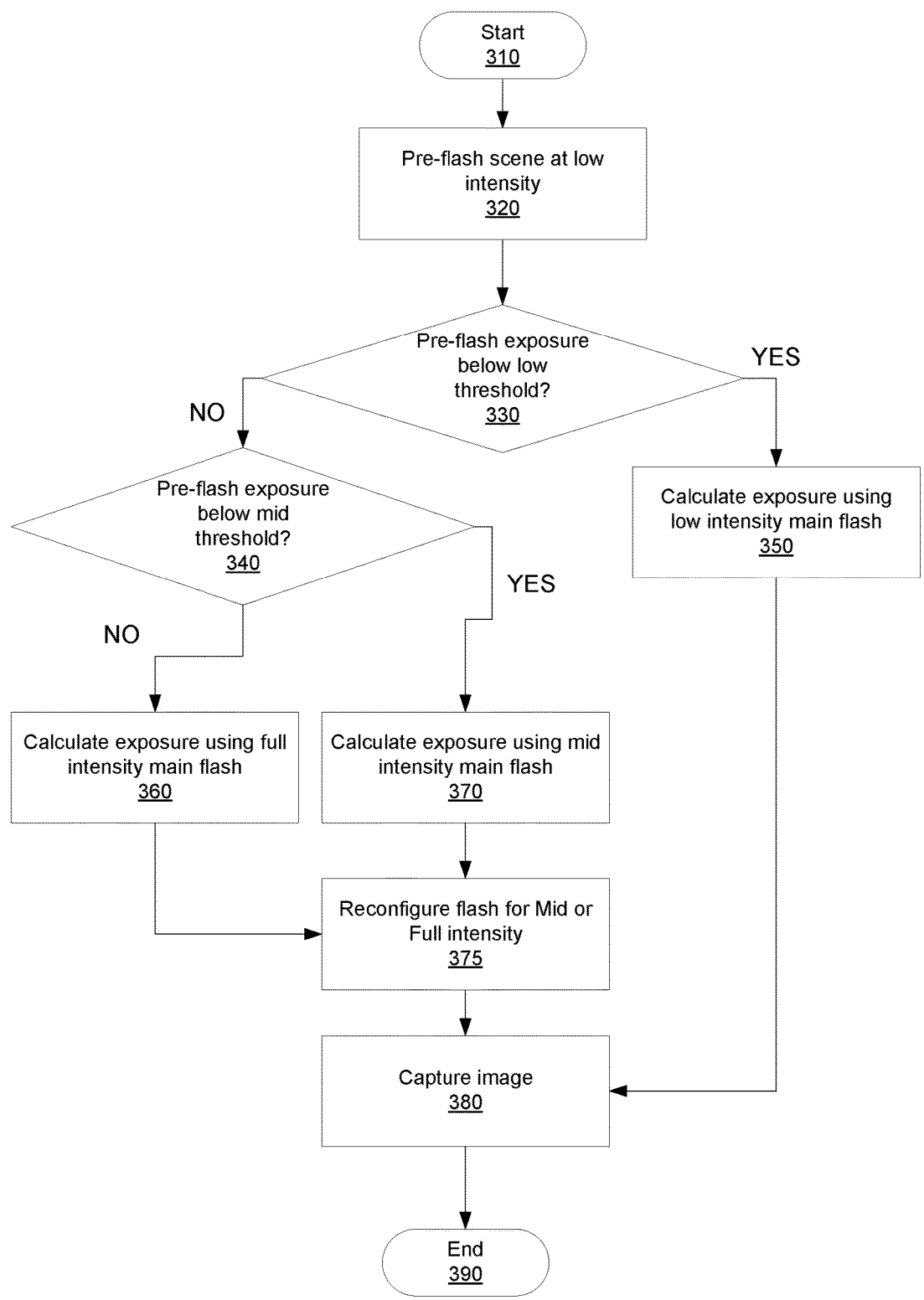
FIG. 3 is a flowchart illustrating a method for adjusting main-flash intensity prior to capturing an image of a scene.

FIG. 3 is a flowchart 300 illustrating a method for adjusting pre-flash intensity prior to capturing an image of a scene. The method begins at block 310. At block 320, prior to capturing an image of a scene, the scene is briefly illuminated with a pre-flash at a low intensity of light. For example, the scene may be illuminated using the light source 175 where flash subsystem 196 has configured light source 175 to output at a low intensity. In some embodiments, the low intensity pre-flash may be at an intensity of around ⅕th of a typical main flash intensity (e.g., the light used to properly expose the scene when capturing the image).

At block 320, after illuminating the scene using the pre-flash at the low-intensity, the device may take exposure measurements of the scene while the scene is being illuminated by the pre-flash at the low intensity. During the pre-flash, the processor may adjust or converge to the exposure sensitivity to obtain a proper luminance within the scene. The exposure measurements may be taken by the device through the lens 182 of camera 180. The exposure measurements may include, but is not limited to, shutter speed, lens aperture and scene luminance. Exposure may be measured in lux seconds, and can be computed from exposure value (EV) (e.g., ISO Speed and exposure time) and scene luminance in a specified region within the scene. For example, a low exposure value (ISO and exposure time) may indicate that the scene is bright and vice versa. The processor 110 may then determine whether the exposure measurements (e.g., EV) of the scene during the pre-flash at the low intensity falls below a "low threshold." The "low threshold" may be a configurable threshold. For example, the processor 110 may determine whether the exposure of the scene measured in EV during the pre-flash at the low intensity falls below a specified low threshold. If the exposure measurements of the scene during the pre-flash at the low intensity falls below the "low threshold," the process may continue to block 350. Otherwise, if the exposure measurements of the scene during the pre-flash at the low intensity does not fall below the "low threshold," the process may continue to block 340.

At block 340, after the processor 110 determines whether the exposure measurements of the scene during the pre-flash at the low intensity falls below the "low threshold," and if the processor 110 determines that the exposure measurements of the scene during the pre-flash at the low intensity falls below the "low threshold," the processor 110 may determine whether the exposure measurements of the scene during the pre-flash at the low intensity falls below a "mid threshold." The "mid threshold" may have a threshold exposure value that is higher than the "low threshold." The exposure measurements of the scene during the pre-flash at the low intensity falling below the "low threshold" may indicate that the scene may be underexposed if the image is captured using a main flash at a low intensity (e.g., the same light intensity as the pre-flash in block 320). Accordingly, the main flash may need to be output at a mid-intensity level or full intensity level in order to properly expose the scene. At block 340, the processor 110 may determine whether the exposure measurements of the scene during the pre-flash at the low intensity falls below a "mid threshold." If the exposure measurements of the scene during the pre-flash at the low intensity level (e.g., block 320) falls below the "mid threshold," the process may continue to block 370. Otherwise, if the exposure measurements of the scene during the pre-flash at the low intensity level does not fall below the "mid threshold," the process may continue to block 360.

At block 350, after the processor 110 determines whether the exposure measurements of the scene during the pre-flash at the low intensity falls below the "low threshold," and if processor 110 determines that the exposure measurements of the scene during the pre-flash at the low intensity falls below the "low threshold," the processor 110 may calculate the proper exposure for the scene based on using a low-intensity main flash. The exposure measurements of the scene during the pre-flash at the low intensity falling below the "low threshold" may indicate that the scene may be properly exposed if the image is captured using a main flash at a low intensity (e.g., the same light intensity as the pre-flash in block 320). In such a case, the light illuminated from the pre-flash (e.g., at a low intensity) may be used to expose the scene. For example, the illumination intensity of the pre-flash may already be at the "low" level of flash intensity, and thus the pre-flash may remain active when it is determined that the scene only requires a "low" level of flash intensity for proper exposure. Accordingly, by leaving the pre-flash on, power savings can be realized since the pre-flash does not need to be turned off prior to activating the main flash, as is usually required. Accordingly, an image of the scene may then be captured by using a main flash at the same low intensity as the pre-flash (e.g., leaving the pre-flash on and not cycling from pre-flash to main flash) in block 380.

At block 360, if the exposure measurements of the scene during the pre-flash at the low intensity level does not fall below the "mid threshold," the processor 110 may calculate the proper exposure for the scene based on using a full-intensity main flash. The exposure measurements of the scene during the pre-flash at the low intensity not falling below the "mid threshold" may indicate that the scene may not be properly exposed if the image is captured using a main flash at a low or mid intensity (e.g., full-intensity main flash may be required to properly expose the scene). Accordingly, the flash may be reconfigured to full-intensity (block 375) and an image of the scene may then be captured by using a main flash at full-intensity in block 380.

At block 370, if the exposure measurements of the scene during the pre-flash at the low intensity level does falls below the "mid threshold," the processor 110 may calculate the proper exposure for the scene based on using a mid-intensity main flash. The exposure measurements of the scene during the pre-flash at the low intensity falling below the "mid threshold" but not falling below the low threshold (block 330) may indicate that the scene may not be properly exposed if the image is captured using a main flash at a low intensity, but may be properly exposed if the image is captured using the main flash at a mid-intensity. Accordingly, the flash may be reconfigured to mid-intensity (block 375) and an image of the scene may then be captured by using a main flash at mid-intensity in block 380.

The above described method may allow for different exposure sensitivity thresholds that may be configurable for the different flash intensities (e.g., low, medium, and high flash intensities). For example, if a scene is determined to have sufficient brightness, a low flash intensity may be use to capture the scene. This may be done without reconfiguring the flash. In another example, if a scene is far and dark, the flash may be reconfigured to have a medium or high flash intensity based on the pre-flash metering (block 320). Being able to configure the flash intensity (e.g. low, mid, full) versus the flash duration may allow for reduced power consumption of the device 100 since a main flash at full intensity may not always be required to properly expose the scene. For example, using a main flash at mid-intensity may result in ½ the power consumption on the device 100 as compared to using the main flash at full intensity. Further, low and mid-intensity main flash can be used dynamically to improve the power consumption on the device 100 without sacrificing image quality.

Figure 4:
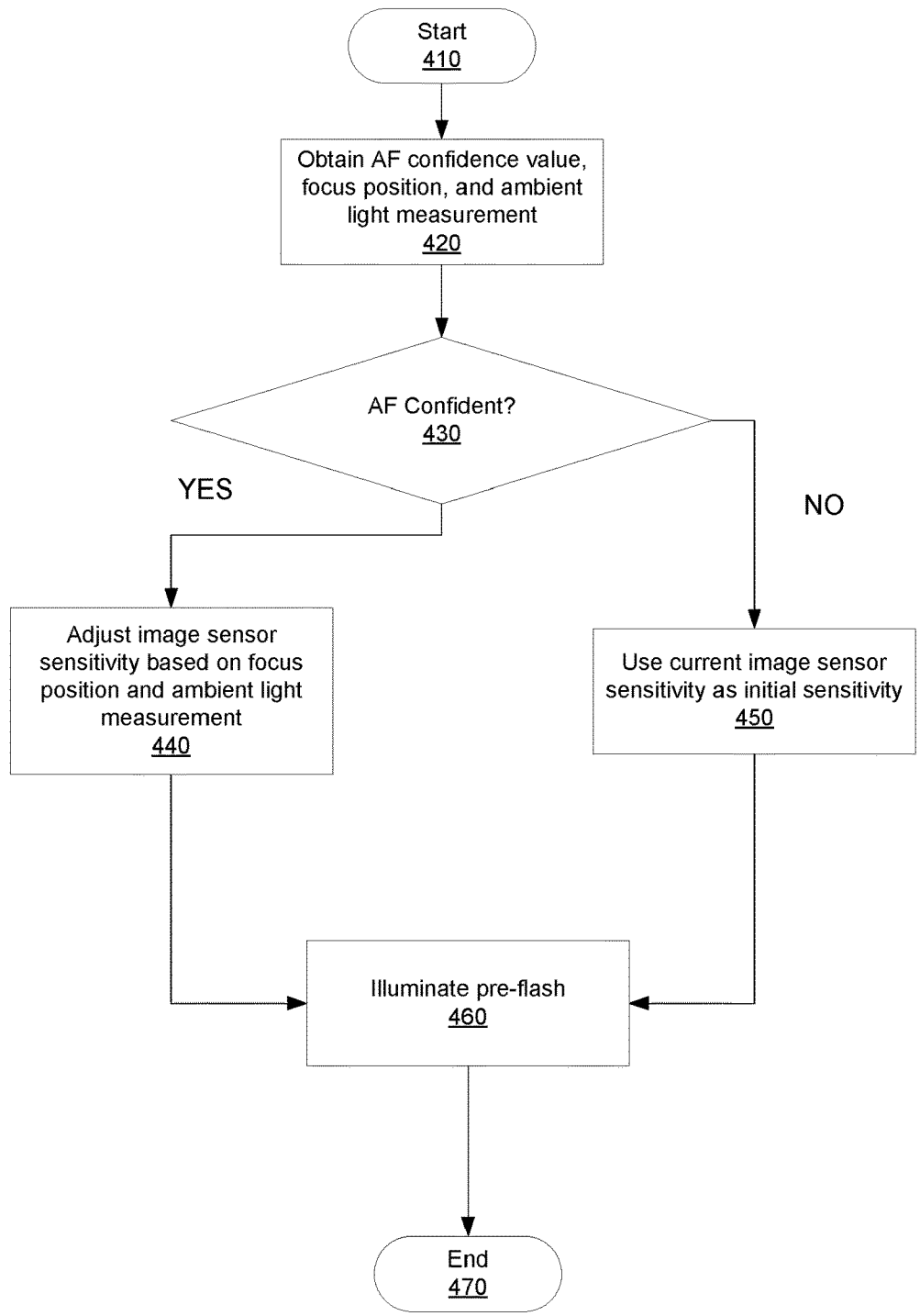
FIG. 4 is a flowchart illustrating a method for adjusting an image sensor sensitivity prior to illuminating a pre-flash.

FIG. 4 is a flowchart 400 illustrating a method for adjusting an image sensor prior to illuminating a pre-flash. The method begins at block 410. At block 420, an autofocus technique may be performed on a scene in order to obtain an autofocus output an ambient light measurement.

For example, autofocus subsystem 192 may perform an autofocus technique on a scene visible through lens 182. The autofocus output obtained from the performed autofocus technique may include an autofocus confidence value and a focus position within the scene. The autofocus confidence value may indicate an amount of confidence in the focus position within the scene determined by the autofocus subsystem 192. The focus position within the scene determined by the autofocus subsystem 192 may be used to obtain a focus position value. The focus position value may be determined by the processor 110 by obtaining the value from a look-up table (LUT) using the focus position as an input and obtaining the focus position value as an output.

An ambient light measurement may be obtained by the ambient light measurement subsystem 194. The ambient light measurement subsystem 194 may interface with the ambient light sensor 170 in order to obtain the ambient light measurement. The ambient light measurement may indicate an amount of ambient light present in the scene and may be measured in lux.

At block 430, after performing an autofocus technique on the scene and obtaining the ambient light measurement of the scene, the processor 110 may determine whether the obtained autofocus confidence value is above or below a threshold confidence value. In some embodiments, the autofocus confidence value may be based on the focus position value obtained from the LUT. If the processor 110 determines that the autofocus confidence value is above a threshold confidence value (e.g., there is confidence in the autofocus output from block 420), the method may continue to block 440. Otherwise, if the processor 110 determines that the autofocus confidence value is below a threshold confidence value (e.g., there isn't confidence in the autofocus output from block 420), the method may continue to block 450.

At block 440, if the processor 110 determines that the autofocus confidence value is above a threshold confidence value in block 430, a sensitivity of the image sensor 184 may be adjusted based on the focus position and the ambient light measurement obtained in block 420. The sensitivity of the image sensor may be defined by an ISO setting and exposure time. The lower the sensitivity the less sensitive the camera may be to light and the finer the grain. Higher sensitivity may generally be used in darker situations to capture more light. The sensitivity of the image sensor 184 may be adjusted by the processor 110 based on the focus position and the ambient light measurement. A database may include different sensitivity settings for different combinations of focus position and ambient light measurements. In some embodiments, the processor 110 may execute an algorithm that calculates the sensitivity setting for a particular focus position and ambient light measurement combination.

Thus, the image sensor sensitivity can be adjusted prior to the pre-flash by using the ambient light measurement and a focus position obtained from autofocus (AF) techniques. The autofocus techniques can include laser AF, phase detection AF, contrast AF, or any other AF technique. For example, if the AF confidence value is high, the image sensor sensitivity can be adjusted based on (1) a look-up-table (LUT) defining sensitivities for various focus positions (i.e., distance to object) in the scene and (2) data from the ambient light sensor. By "pre-adjusting" the image sensor sensitivity prior to the pre-flash, the time for pre-flash convergence may be reduced and overall flash time for all scenes may also be reduced, resulting in power savings on the device and a faster pre-flash process. In some embodiments, the LUT may include both AF confidence values and image sensor sensitivities. For example, in a low light scene, if the AF has a confidence value above a threshold and indicates that the object is close to the device, the image sensor sensitivity may be reduced to avoid the initial saturation and may assist with faster convergence.

At block 450, if the processor 110 determines that the autofocus confidence value is below a threshold confidence value in block 430, a sensitivity of the image sensor 184 may not be adjusted. That is, the sensitivity of the image sensor may be not be adjusted prior to illuminating the scene with the pre-flash. The image sensor sensitivity may be adjusted at some point after the pre-flash during normal metering of the scene.

At block 460, the scene may be illuminated with a pre-flash via light source 175. Flash subsystem 196 may interface with light source 175 to output the light for the pre-flash. The device 100 may then measure the output pre-flash with the ambient light level to calculate the power needed in the main flash to properly expose the scene prior to capturing the image. As mentioned above, by configuring the initial sensitivity of the image sensor 184, the pre-flash convergence may be faster and overall flash snapshot latency by be reduced by ~100 to 150 ms. This may also result in power savings for the device 100.

Figure 5:
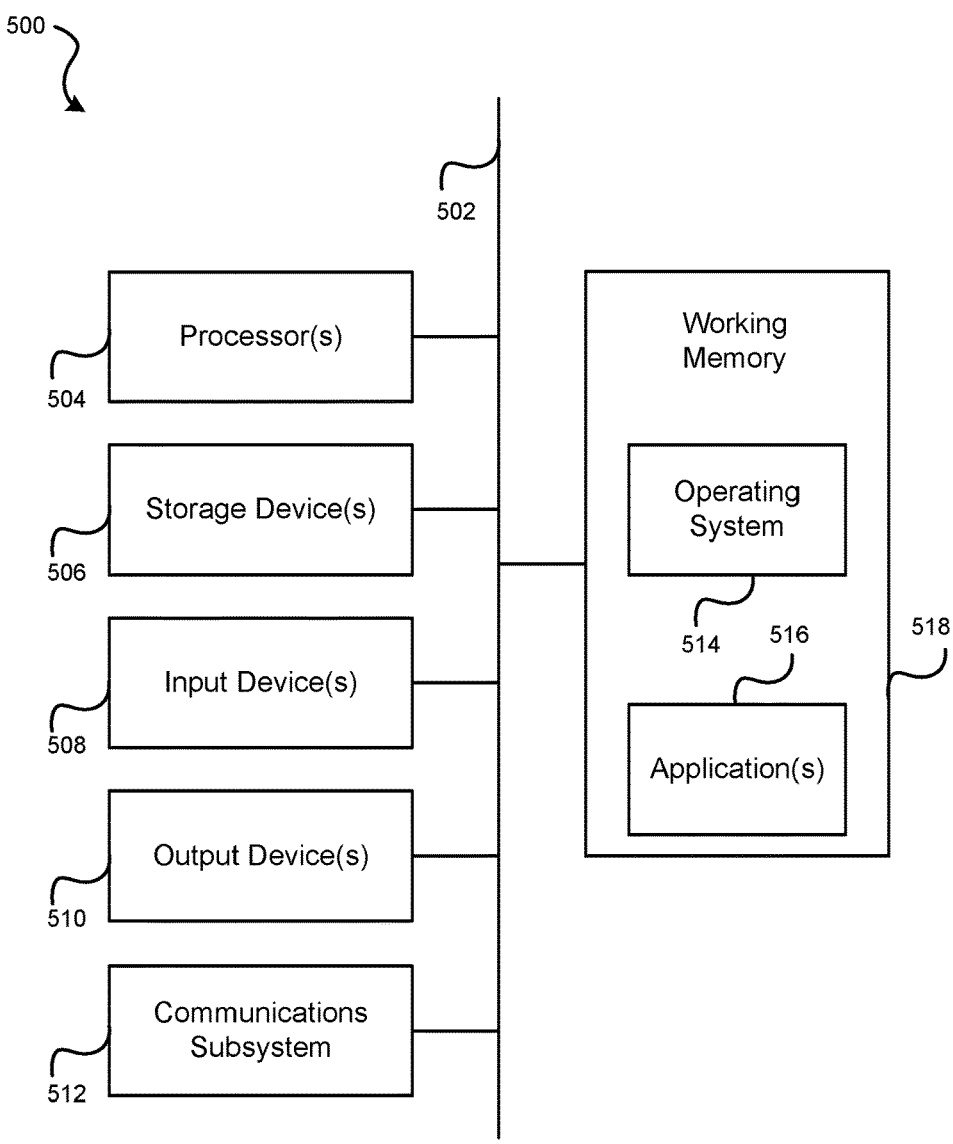
FIG. 5 illustrates an example of a computing system in which one or more embodiments may be implemented.

FIG. 5 illustrates an example of a computing system in which one or more embodiments may be implemented. A computer system as illustrated in FIG. 5 may be incorporated as part of the above described computerized device. For example, computer system 500 can represent some of the components of a television, a computing device, a server, a desktop, a workstation, a control or interaction system in an automobile, a tablet, a netbook or any other suitable computing system. A computing device may be any computing device with an image capture device or input sensory unit and a user output device. An image capture device or input sensory unit may be a camera device. A user output device may be a display unit. Examples of a computing device include but are not limited to video game consoles, tablets, smart phones and any other hand-held devices. FIG. 5 provides a schematic illustration of one embodiment of a computer system 500 that can perform the methods provided by various other embodiments, as described herein, and/or can function as the host computer system, a remote kiosk/terminal, a point-of-sale device, a telephonic or navigation or multimedia interface in an automobile, a computing device, a set-top box, a table computer and/or a computer system. FIG. 5 is meant only to provide a generalized illustration of various components, any or all of which may be utilized as appropriate. FIG. 5, therefore, broadly illustrates how individual system elements may be implemented in a relatively separated or relatively more integrated manner. In some embodiments, elements computer system 500 may be used to implement functionality of device 100 in FIG. 1.

The computer system 500 is shown comprising hardware elements that can be electrically coupled via a bus 502 (or may otherwise be in communication, as appropriate). The hardware elements may include one or more processors 504, including without limitation one or more general-purpose processors and/or one or more special-purpose processors (such as digital signal processing chips, graphics acceleration processors, and/or the like); one or more input devices 508, which can include without limitation one or more cameras, sensors, a mouse, a keyboard, a microphone configured to detect ultrasound or other sounds, and/or the like; and one or more output devices 510, which can include without limitation a display unit such as the device used in embodiments of the invention, a printer and/or the like.

In some implementations of the embodiments of the invention, various input devices 508 and output devices 510 may be embedded into interfaces such as display devices, tables, floors, walls, and window screens. Furthermore, input devices 508 and output devices 510 coupled to the processors may form multi-dimensional tracking systems.

The computer system 500 may further include (and/or be in communication with) one or more non-transitory storage devices 506, which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data storage, including without limitation, various file systems, database structures, and/or the like.

The computer system 500 might also include a communications subsystem 512, which can include without limitation a modem, a network card (wireless or wired), an infrared device, a wireless device and/or chipset (such as a Bluetooth™ device, an 802.11 device, a Wi-Fi device, a WiMax device, cellular communication facilities, etc.), and/or the like. The communications subsystem 512 may permit data to be exchanged with a network, other computer systems, and/or any other devices described herein. In many embodiments, the computer system 500 will further comprise a non-transitory working memory 518, which can include a RAM or ROM device, as described above.

The computer system 500 also can comprise software elements, shown as being currently located within the working memory 518, including an operating system 514, device drivers, executable libraries, and/or other code, such as one or more application programs 516, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a computer-readable storage medium, such as the storage device(s) 506 described above. In some cases, the storage medium might be incorporated within a computer system, such as computer system 500. In other embodiments, the storage medium might be separate from a computer system (e.g., a removable medium, such as a compact disc), and/or provided in an installation package, such that the storage medium can be used to program, configure and/or adapt a general purpose computer with the instructions/code stored thereon. These instructions might take the form of executable code, which is executable by the computer system 500 and/or might take the form of source and/or installable code, which, upon compilation and/or installation on the computer system 500 (e.g., using any of a variety of generally available compilers, installation programs, compression/decompression utilities, etc.) then takes the form of executable code.

Substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed. In some embodiments, one or more elements of the computer system 500 may be omitted or may be implemented separate from the illustrated system. For example, the processor 504 and/or other elements may be implemented separate from the input device 508. In one embodiment, the processor is configured to receive images from one or more cameras that are separately implemented. In some embodiments, elements in addition to those illustrated in FIG. 5 may be included in the computer system 500.

Some embodiments may employ a computer system (such as the computer system 500) to perform methods in accordance with the disclosure. For example, some or all of the procedures of the described methods may be performed by the computer system 500 in response to processor 504 executing one or more sequences of one or more instructions (which might be incorporated into the operating system 514 and/or other code, such as an application program 516) contained in the working memory 518. Such instructions may be read into the working memory 518 from another computer-readable medium, such as one or more of the storage device(s) 506. Merely by way of example, execution of the sequences of instructions contained in the working memory 518 might cause the processor(s) 504 to perform one or more procedures of the methods described herein.

The terms "machine-readable medium" and "computer-readable medium," as used herein, refer to any medium that participates in providing data that causes a machine to operate in a specific fashion. In some embodiments implemented using the computer system 500, various computer-readable media might be involved in providing instructions/code to processor(s) 504 for execution and/or might be used to store and/or carry such instructions/code (e.g., as signals). In many implementations, a computer-readable medium is a physical and/or tangible storage medium. Such a medium may take many forms, including but not limited to, non-volatile media, volatile media, and transmission media. Non-volatile media include, for example, optical and/or magnetic disks, such as the storage device(s) 506. Volatile media include, without limitation, dynamic memory, such as the working memory 518. Transmission media include, without limitation, coaxial cables, copper wire and fiber optics, including the wires that comprise the bus 502, as well as the various components of the communications subsystem 512 (and/or the media by which the communications subsystem 512 provides communication with other devices). Hence, transmission media can also take the form of waves (including without limitation radio, acoustic and/or light waves, such as those generated during radio-wave and infrared data communications).

Common forms of physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, EPROM, a FLASH-EPROM, any other memory chip or cartridge, a carrier wave as described hereinafter, or any other medium from which a computer can read instructions and/or code.

Various forms of computer-readable media may be involved in carrying one or more sequences of one or more instructions to the processor(s) 504 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 500. These signals, which might be in the form of electromagnetic signals, acoustic signals, optical signals and/or the like, are all examples of carrier waves on which instructions can be encoded, in accordance with various embodiments of the invention.

The communications subsystem 512 (and/or components thereof) generally will receive the signals, and the bus 502 then might carry the signals (and/or the data, instructions, etc. carried by the signals) to the working memory 518, from which the processor(s) 504 retrieves and executes the instructions. The instructions received by the working memory 518 may optionally be stored on a non-transitory storage device 506 either before or after execution by the processor(s) 504.

The methods, systems, and devices discussed above are examples. Various embodiments may omit, substitute, or add various procedures or components as appropriate. For instance, in alternative configurations, the methods described may be performed in an order different from that described, and/or various stages may be added, omitted, and/or combined. Also, features described with respect to certain embodiments may be combined in various other embodiments. Different aspects and elements of the embodiments may be combined in a similar manner. Also, technology evolves and, thus, many of the elements are examples that do not limit the scope of the disclosure to those specific examples.

Specific details are given in the description to provide a thorough understanding of the embodiments. However, embodiments may be practiced without these specific details. For example, well-known circuits, processes, algorithms, structures, and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing embodiments of the invention. Various changes may be made in the function and arrangement of elements without departing from the spirit and scope of the invention.

Also, some embodiments are described as processes depicted as flow diagrams or block diagrams. Although each may describe the operations as a sequential process, many of the operations can be performed in parallel or concurrently.

In addition, the order of the operations may be rearranged. A process may have additional steps not included in the figures. Furthermore, embodiments of the methods may be implemented by hardware, software, firmware, middleware, microcode, hardware description languages, or any combination thereof. When implemented in software, firmware, middleware, or microcode, the program code or code segments to perform the associated tasks may be stored in a computer-readable medium such as a storage medium. Processors may perform the associated tasks. Thus, in the description above, functions or methods that are described as being performed by the computer system may be performed by a processor—for example, the processor 504—configured to perform the functions or methods. Further, such functions or methods may be performed by a processor executing instructions stored on one or more computer readable media.

Having described several embodiments, various modifications, alternative constructions, and equivalents may be used without departing from the spirit of the disclosure. For example, the above elements may merely be a component of a larger system, wherein other rules may take precedence over or otherwise modify the application of the invention. Also, a number of steps may be undertaken before, during, or after the above elements are considered. Accordingly, the above description does not limit the scope of the disclosure.

Various examples have been described. These and other examples are within the scope of the following claims.

What is claimed is:

1. A method, comprising:
   performing an autofocus technique on a scene to obtain an autofocus output;
   receiving light from the scene;
   obtaining an ambient light measurement of the scene based on the received light;
   adjusting a sensitivity of an image sensor based at least in part on the autofocus output and the ambient light measurement, wherein the sensitivity is adjusted to avoid saturation of the image sensor when illuminating the scene using a pre-flash at a first intensity;
   after adjusting the sensitivity of the image sensor, illuminating the scene using the pre-flash at the first intensity;
   determining a second intensity to use for a main flash, wherein the second intensity is greater than or equal to the first intensity;
   illuminating the scene using the main flash at the second intensity; and
   capturing, using the image sensor, the scene as illuminated by the main flash.

2. The method of claim 1, wherein the autofocus output comprises an autofocus confidence value and a focus position pertaining to the scene.

3. The method of claim 2, further comprising:
   determining whether the autofocus confidence value is above a threshold confidence value; and
   obtaining a focus position value from a look-up table (LUT), based at least in part on the focus position.

4. The method of claim 2, further comprising:
   determining whether the autofocus confidence value is below a threshold confidence value; and
   in response to determining that the autofocus confidence value is below the threshold confidence value, not performing the adjusting step.

5. The method of claim 1, wherein the autofocus output comprises a focus position pertaining to the scene.

6. The method of claim 1, wherein the image sensor is housed within a camera device.

7. The method of claim 1, wherein the autofocus technique comprises at least one of the following autofocus techniques: laser autofocus, phase detection autofocus, or contrast autofocus.

8. A system, comprising:
   a lens;
   a light source;
   an image sensor coupled to a processor;
   an ambient light sensor coupled to the processor and configured to receive light from a scene, wherein the processor is configured to:
   perform an autofocus technique on the scene to obtain an autofocus output;
   obtain an ambient light measurement of the scene based on the received light;
   adjust a sensitivity of the image sensor based at least in part on the autofocus output and the ambient light measurement, wherein the processor adjusts the sensitivity to avoid saturation of the image sensor when illuminating the scene using a pre-flash at a first intensity;
   after adjusting the sensitivity of the image sensor, illuminate the scene using the light source to produce the pre-flash at the first intensity;
   determine a second intensity to use for a main flash, wherein the second intensity is greater than or equal to the first intensity;
   illuminate the scene using the main flash at the second intensity; and
   capture, using the image sensor, the scene as illuminated by the main flash.

9. The system of claim 8, wherein the autofocus output comprises an autofocus confidence value and a focus position pertaining to the scene.

10. The system of claim 9, wherein the processor is further configured to:
    determine whether the autofocus confidence value is above a threshold confidence value; and
    obtain a focus position value from a look-up table (LUT), based at least in part on the focus position.

11. The system of claim 9, wherein the processor is further configured to:
    determine whether the autofocus confidence value is below a threshold confidence value; and
    in response to determining that the autofocus confidence value is below the threshold confidence value, not perform the adjusting step.

12. The system of claim 8, wherein the autofocus output comprises a focus position pertaining to the scene.

13. The system of claim 8, wherein the system is a camera device.

14. The system of claim 8, wherein the autofocus technique comprises at least one of the following autofocus techniques: laser autofocus, phase detection autofocus, or contrast autofocus.

15. An apparatus, comprising:
    means for performing an autofocus technique on a scene to obtain an autofocus output;
    means for receiving light from the scene;
    means for obtaining an ambient light measurement of the scene based on the received light;
    means for adjusting a sensitivity of an image sensor based at least in part on the autofocus output and the ambient light measurement, wherein the sensitivity is adjusted to avoid saturation of the image sensor when illuminating the scene using a pre-flash at a first intensity;

means for, after adjusting the sensitivity of the image sensor, illuminating the scene using the pre-flash at the first intensity;

means for determining a second intensity to use for a main flash, wherein the second intensity is greater than or equal to the first intensity;

means for illuminating the scene using the main flash at the second intensity; and means for capturing, using the image sensor, the scene as illuminated by the main flash.

16. The apparatus of claim 15, wherein the autofocus output comprises an autofocus confidence value and a focus position pertaining to the scene.

17. The apparatus of claim 16, further comprising:

means for determining whether the autofocus confidence value is above a threshold confidence value; and in response to determining that the autofocus confidence value is below the threshold confidence value, means for not perform the adjusting step.

18. The apparatus of claim 15, wherein the autofocus output comprises a focus position pertaining to the scene.

19. The apparatus of claim 15, wherein the autofocus technique comprises at least one of the following autofocus techniques: laser autofocus, phase detection autofocus, or contrast autofocus.

20. One or more non-transitory computer-readable media storing computer-executable instructions that, when executed, cause one or more computing devices to:

perform an autofocus technique on a scene to obtain an autofocus output;

receive light from the scene;

obtain an ambient light measurement of the scene based on the received light;

adjust a sensitivity of an image sensor based at least in part on the autofocus output and the ambient light measurement, wherein the sensitivity is adjusted to avoid saturation of the image sensor when illuminating the scene using a pre-flash at a first intensity;

after adjusting the sensitivity of the image sensor, illuminate the scene using the pre-flash at the first intensity;

determine a second intensity to use for a main flash, wherein the second intensity is greater than or equal to the first intensity;

illuminate the scene using the main flash at the second intensity; and capture, using the image sensor, the scene as illuminated by the main flash.

21. The non-transitory computer-readable media of claim 20, wherein the autofocus output comprises an autofocus confidence value and a focus position pertaining to the scene.

22. The non-transitory computer-readable media of claim 21, wherein the instructions that, when executed, further cause the one or more computing devices to:

determine whether the autofocus confidence value is above a threshold confidence value; and obtain a focus position value from a look-up table (LUT), based at least in part on the focus position.

23. The non-transitory computer-readable media of claim 21, wherein the instructions that, when executed, further cause the one or more computing devices to:

determine whether the autofocus confidence value is below a threshold confidence value; and in response to determining that the autofocus confidence value is below the threshold confidence value, not perform the adjusting step.

24. The non-transitory computer-readable media of claim 20, wherein the autofocus output comprises a focus position pertaining to the scene.

25. The non-transitory computer-readable media of claim 20, wherein image sensor is housed within a camera device.

26. The non-transitory computer-readable media of claim 20, wherein the autofocus technique comprises at least one of the following autofocus techniques:

laser autofocus, phase detection autofocus, or contrast autofocus.

27. The method of claim 1, further comprising:

performing an exposure measurement of the scene as illuminated by the pre-flash, wherein the second intensity is determined based on the exposure measurement.

28. The method of claim 27, further comprising:

calculating, based on the determined second intensity, an exposure to use for the main flash.

* * * * *